United States Patent
Choumach et al.

(10) Patent No.: US 11,757,342 B2
(45) Date of Patent: Sep. 12, 2023

(54) WEAR INDICATOR FOR TRACK AND MOVER SYSTEM

(71) Applicant: ROCKWELL AUTOMATION TECHNOLOGIES, INC., Mayfield Heights, OH (US)

(72) Inventors: Azeddine Choumach, Devens, MA (US); John Pearlman, Devens, MA (US); Tracy M. Clark, Boston, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 175 days.

(21) Appl. No.: 17/476,139

(22) Filed: Sep. 15, 2021

(65) Prior Publication Data

US 2023/0079622 A1 Mar. 16, 2023

(51) Int. Cl.
*H02K 41/02* (2006.01)
*H02K 11/20* (2016.01)
*H02K 5/00* (2006.01)
*H02K 7/08* (2006.01)

(52) U.S. Cl.
CPC ............... *H02K 41/02* (2013.01); *H02K 5/00* (2013.01); *H02K 7/08* (2013.01); *H02K 11/20* (2016.01)

(58) Field of Classification Search
CPC ........ B65G 54/02; H02K 11/20; H02K 41/02; H02K 41/031; H02K 5/00; H02K 5/167; H02K 7/08
See application file for complete search history.

(56) References Cited

U.S. PATENT DOCUMENTS

| 2016/0281789 A1* | 9/2016 | Kleinikkink | B65G 45/02 |
| 2017/0346380 A1* | 11/2017 | Weber | B60L 15/38 |
| 2021/0116509 A1* | 4/2021 | Kiendl | G01R 31/343 |

OTHER PUBLICATIONS

Extended European Search Report for Application No. 22193865.7 dated Feb. 6, 2023, 7 pages.

* cited by examiner

*Primary Examiner* — Naishadh N Desai
(74) *Attorney, Agent, or Firm* — Fletcher Yoder, P.C.

(57) ABSTRACT

The present disclosure describes a mover of a linear motor system. The mover includes a housing and a material coupled to the housing, the material having one or more protrusions extending towards a track of the linear motor system. The mover also includes a bearing to interface with the track. The bearing includes one or more recesses extending from a first surface of the bearing toward a second surface of the bearing, opposite the first surface. Each of the one or more recesses receives a respective protrusion of the one or more protrusions of the material. The bearing wears away from the second surface over time as the mover travels along the track, exposing the one or more protrusions to the track.

20 Claims, 6 Drawing Sheets

WEAR INDICATOR FOR TRACK AND MOVER SYSTEM

BACKGROUND

The present disclosure relates generally to linear drive transport systems, and more particularly, to wear indicators of movers in linear drive transport systems.

A range of linear motors are known and in use throughout industry, particularly in manufacturing, filling, and material handling applications. Such motors typically include an elongated track in which motor coils are associated with a stator core, such as a laminated core. The coils may have various orientations, depending upon the motor design. A permanent magnet mover may be placed on the track, and fields resulting from selective energization of the track coils interact with permanent magnets of the mover to cause the mover to move along the track in desired directions, speeds, and accelerations, and to stop and start at desired locations. Highly flexible and precise control of movement of one or many movers may be achieved by control and driver circuitry associated with the coils of the track sections.

Appropriate spacing between the permanent magnets of the mover and the coils of the track helps to ensure control and/or maximum thrust of the mover. Bearings of the mover may move along rails of the track and may eventually wear down. As the bearings wear down due to time and/or use of the mover, the permanent magnets and coils of the track may move away from the appropriate spacing and may result in inefficient operation of the linear motor and mover and/or may damage the linear motor or mover. Accordingly, as discussed, herein, providing wear indicators to notify users to replace bearings of the movers may increase operational efficiency and may reduce chances of damaging the linear motor and mover system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a mover of a linear motor system includes a housing and a material coupled to the housing, the material comprising one or more protrusions configured to extend towards a track of the linear motor system. The mover also includes a bearing configured to interface with the track, wherein the bearing comprises one or more recesses extending from a first surface of the bearing toward a second surface of the bearing, opposite the first surface, wherein each of the one or more recesses is configured to receive a respective protrusion of the one or more protrusions of the material, wherein the bearing is configured to wear away from the second surface over time as the mover travels along the track, exposing the one or more protrusions to the track.

In another embodiment, a linear motor system includes a track section comprising a plurality of coils energizable to create a controlled magnetic field and a mover configured to be displaced by the controlled magnetic field. The mover includes a magnet array configured to be disposed a threshold distance range away from the plurality of coils and a wear indicator comprising a tab, wherein the tab of the wear indicator is configured to interface with the track section of the linear motor system when the magnet array falls outside the threshold distance range from the plurality of the coils.

In yet another embodiment, a method includes operating a plurality of coils of a track to create a controlled magnetic field and moving a mover along the track with the controlled magnetic field, wherein a bearing of the mover is configured to interface with the track and wear away over time as the mover travels along the track. The method also includes in response to the mover traveling a threshold distance along the track, exposing a wear indicator configured to interface with the track, wherein the wear indicator is configured to reduce movement of the mover along the track.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 1:
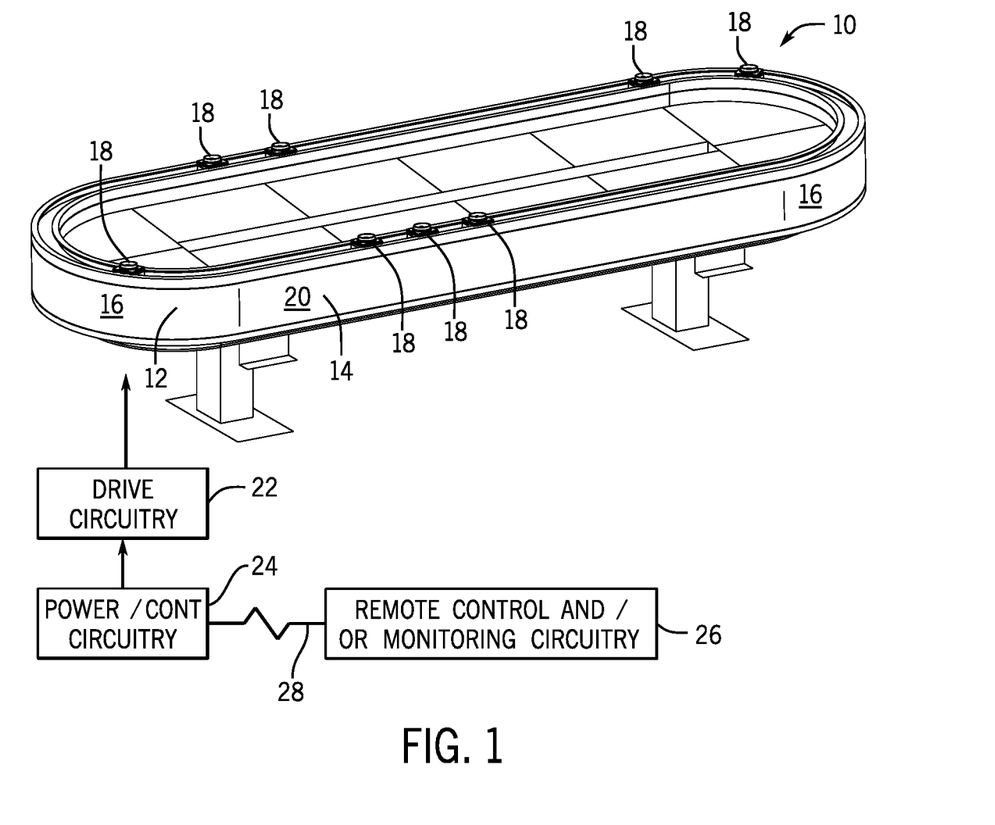
FIG. 1 is a perspective view of an exemplary linear motor system illustrating straight and curved track sections and several movers positioned for movement along the track sections, in accordance with embodiments described herein.

Turning now to the drawings, and referring first to FIG. 1, a linear motor system 10 as illustrated for moving articles or products around a track 12. As will be appreciated by those skilled in the art, in many applications, the linear motor system 10 may inter-operate with other machines, robots, conveyers, control equipment, and so forth (not separately shown) in an overall automation, packaging, material handling or other application. The linear motor system 10 may generally be referred to a "linear motor" as discussed below, in which the moving components are positioned, accelerated, decelerated, and generally moved under the influence of controlled magnetic and electromagnetic fields. In the illustrated embodiment, the track 12 comprises multiple straight track sections 14 and multiple curved track sections 16. These sections may be generally self-contained and mountable in various physical configurations, such as the oval illustrated in FIG. 1. It should be noted that other configurations are also possible as discussed below. The configurations may form closed loops of various shapes, but may also include open-ended segments. The linear motor system 10 may also include one or more movers 18, which may be mounted to and movable along the track 12. Again, the position, velocity, acceleration, and higher order derivative parameters are controllable for these movers 18 by appropriate control of the coils of the system that are energized and de-energized. In the illustrated embodiment, the movers 18 interact with stationary elements in and around an outer periphery 20 of the track sections 16, although other configurations are envisaged.

Each mover 18 may include a mounting platform. In an actual implementation, various tools, holders, support structures, loads, and so forth may be mounted to this mounting platform. The movers 18 themselves may be configured differently from those shown in order accommodate the various loads. While a horizontal configuration is illustrated in FIG. 1, other orientations may also be provided, such as ones in which the illustrated oval is generally stood on a side or end, or at any angle between.

The linear motor system 10 may also include circuitry for controlling a movement of the movers. In the embodiment illustrated in FIG. 1, this circuitry may include drive circuitry 22 that provides signals to each track section 16, and specifically individual coils of the track sections 16 to create electromotive forces that interact with magnets on the track sections 16 to drive the movers 18 to specific locations, and at specific velocity, accelerations, and so forth. This drive circuitry 22 may typically include inverter circuitry that makes use of power electronic switches to provide drive power to the individual coils of each section in a controlled manner. In some embodiments, the drive circuitry 22 may be included in each individual track section 16, and signals provided to the drive circuitry 22 by power and control circuitry 24. This power and control circuitry 24 (and the drive circuitry 22) may receive feedback from the movers 18 to detect the location, velocity, acceleration, and so forth of each mover 18. In certain embodiments, the movers 18 may also be recognized by the power and control circuitry 24 as individual axes that are independently controlled, but with regulation of their position, velocity, and acceleration to avoid conflicts, collisions, and so forth. The particular motion profile implemented by the power and control circuitry 24 may typically be implemented upon the design and commissioning of the linear motor system 10, depending upon the particular task to be performed. Finally, various remote control and/or monitoring circuitry 26 may be provided and may be linked to the linear motor system 10 by one or more networks 28. Such remote circuitry 26 may generally allow for coordination of the operation of the linear motor system 10 with other automation components, machine systems, manufacturing and material handling machines, and so forth.

Figure 2:
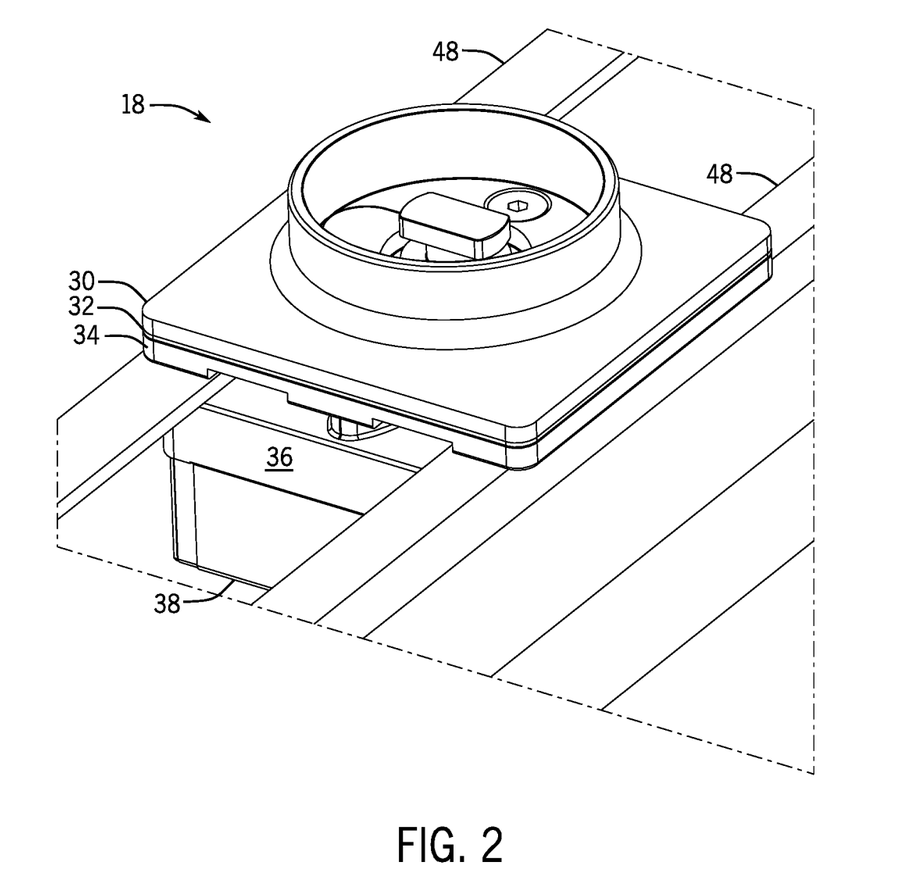
FIG. 2 is a perspective view of one of the movers of the linear motor system of FIG. 1, in accordance with embodiments described herein.

FIG. 2 is a perspective view of one of the movers 18 of the linear motor system. The mover 18 is positioned along a track section including rails 48. The mover 18 may include a housing 30, a wear indicator 32, a bearing 34, a plate 36, and a magnet array 38. The housing 30, the wear indicator 32, and the bearing 34 may be disposed on a first side (e.g., above) the rails 48. The housing 30 may be coupled to the wear indicator 32 and the bearing 34 (e.g., via fasteners) and may preload the wear indicator 32 and the bearing 34. In certain embodiments, the housing 30 may be removably coupled to the wear indicator 32 and the bearing 34. Accordingly, the wear indicator 32 and the bearing 34 may be replaced (e.g., due to wear) by removing the housing 30 and inserting a new wear indicator 32 and/or new bearing 34. The wear indicator 32 may be formed of a rubber material, a cork material, a fluoroelastomer material (e.g., Viton), any other suitable material, or any combination thereof and may be disposed between the housing 30 and the bearing 34. The mover 18 may engage and move along the rails 48. For example, a bottom surface of the bearing 34 may engage a top surface of the rails 48 as the mover 18 moves along the track. The bearing 34 may be formed of a polymer material, such as polyacetal, a plastic material, such as IGUS 350, a polyether ether ketone (PEEK) material, a polytetrafluoroethylene (PTFE) material, any other suitable material, or any combination thereof and may permit linear motion of the mover 18 along the rails 48. The bearing 34 may be formed of a material having a lower coefficient of friction when contacting the rails 48 than a coefficient of friction of the material of the wear indicator 32 when contacting the rails. As such, the bearing 34 may permit movement of the mover 18 along the rails 48 at lower forces than when the wear indicator 32 contacts the rails 48. In certain embodiments, the bearing 34 may be formed of a material appropriate for a desired task (e.g., via an industry standard). For example, the bearing 34 may be formed of a food grade polymer for bottling and food contact tasks. As another example, the bearing 34 may be formed of a hygienic material for hygienic tasks. The bearing 34 may begin to wear down as the mover 18 travels along the rails 48 (e.g., over hundreds, thousands, or tens of thousands of kilometers traveled). After a portion of the bearing 34 is worn away, a portion of the wear indicator 32 may be exposed to and engage at least one of the rails 48. For example, the mover 18 may have a lifetime of up to 5,000 km (e.g., up to 7,500 km, up to 10,000 km, up to 12,000 km, up to 15,000 km, up to 16,000 km, and so forth). When brought into contact with at least one of the rails 48, the wear indicator 32 may slow and/or bring the mover 18 to a stop and may prevent movement of the mover 18. Accordingly, the wear indicator 32 may provide a notification to a user of the linear motor system 10 that the permanent magnets of the mover 18 are no longer within a threshold spacing range from the coils of the track section 16. The plate 36 may be disposed at least partially on a second side of (e.g., below) the rails 48 and may be coupled to the housing 30 (e.g., via fasteners). The plate 36 may be coupled to the magnet array 38 and may keep the mover 18 in alignment with the rails 48.

Figure 3:
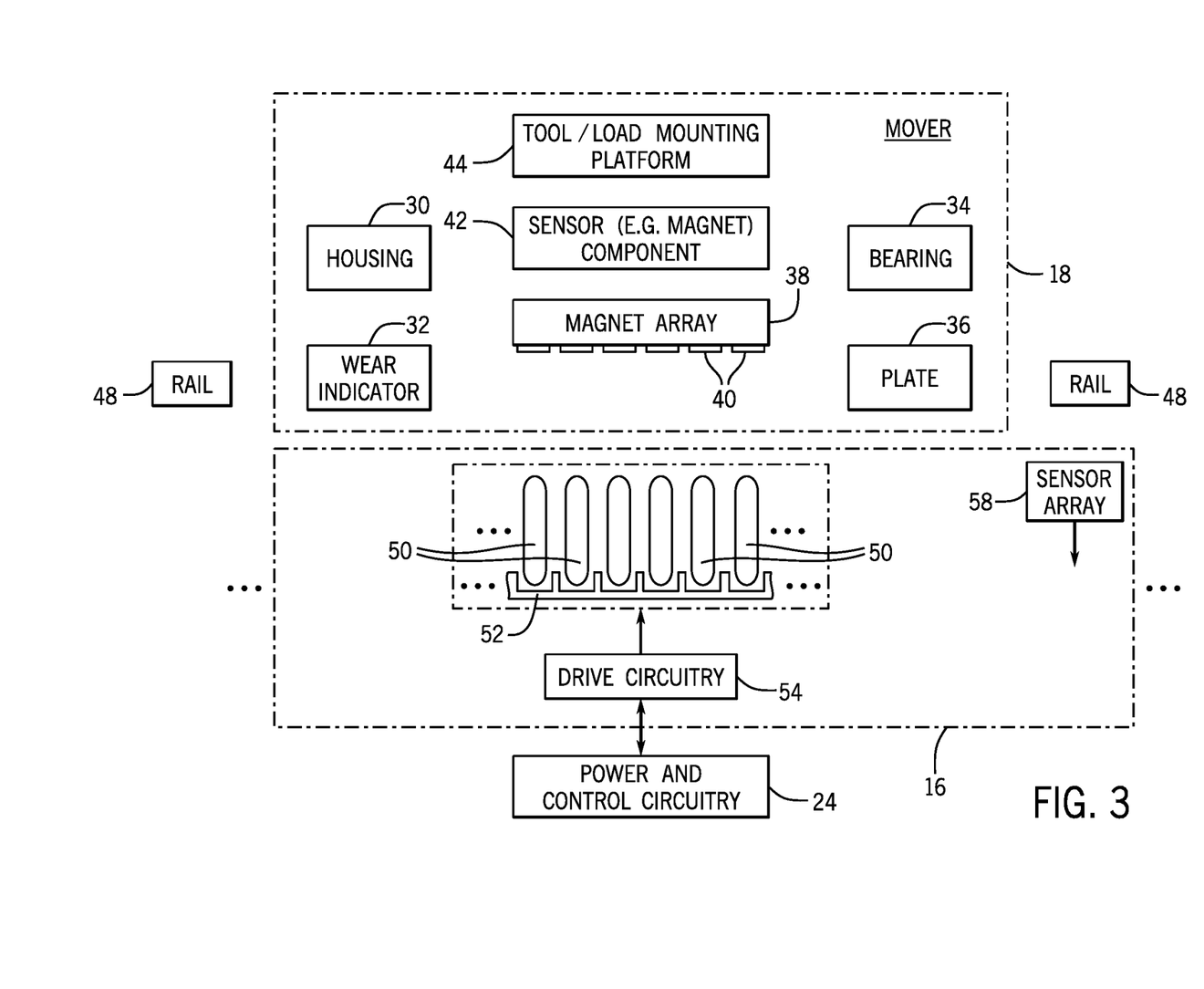
FIG. 3 is a diagrammatical representation of the system of FIGS. 1 and 2, in accordance with embodiments described herein.

FIG. 3 is a diagrammatical representation of the linear motor system 10 showing one track section 16 and one mover 18 positioned along the track section 16. The track section 16 illustrated in FIG. 3 may be a straight or curved track section, these two differing in their physical configuration, and certain of the actual characteristics owing to the curved nature of the curved sections as discussed below. In general, however, each mover 18 may include a magnet array 38 on which a number of magnets 40 may be mounted. These magnets 40 may be permanent magnets and are mounted such that a small air gap is provided between the magnets 40 and coils 50 of the track section 16. The small air gap may be predetermined and may be selected to provide a maximum thrust and/or efficiency of the mover 18. In certain embodiments, the air gap may be up to a threshold distance (e.g., up to 0.25 mm, up to 0.5 mm, up to 1 mm, up to 5 mm, up to 8 mm, up to 10 mm, and so forth). Additionally or alternatively, the air gap may be a threshold distance range (e.g., between 0.25 mm to 1 mm, 0.5 mm to 1 mm, 0.5 mm to 8 mm, 1 mm to 5 mm, and 1 mm to 10 mm, and so forth). As the bearing 34 continues to wear through use of the mover 18, the air gap may change in size. For example, as the bearing 34 wears down, the permanent magnets 40 may move lower beneath the rails 48 and closer to the coils 50, decreasing the size of the air gap. Through continued use of the mover 18, the bearing 34 may be subject to a predetermined amount of wear. As such, the permanent magnets 40 and coils 50 may fall outside a threshold distance range for efficient operation and/or control of the mover 18. As shown in FIG. 3, the mover 18 may also include a sensor component 42, such as a permanent magnet, energized coils, Hall effect sensors, or any other suitable devices. It should be noted, however, that the particular sensor component 42 included in the mover 18 may depend upon the nature of the sensing strategy, the sensing resolution, the position of the sensor 42 on the mover 18 (and cooperating components on the track section 16), and so forth. In certain embodiments, the sensor component 42 may be disposed within a portion of the wear indicator 32 and/or the bearing 34. For example, the sensor component 42 may detect a portion of the wear indicator is within a threshold distance of the rails and/or may engage the rails 48 after a predetermined amount of wear of the bearing 34. The sensor component 42 may sense the rails 48 and/or detect engagement with the rails 48 and may provide a notification to a user of the linear motor system 10. For example, the sensor component 42 may generate an audible alert (e.g., alarm), a visual alert (e.g., light, blinking light, exposed portion of wear indicator), a tactile alert (e.g., vibration), and any other suitable alert. In some embodiments, the sensor component 42 may transmit the notification to a controller, such as remote control and/or monitoring circuitry 26. For example, the remote control and/or monitoring circuitry 26 may include a user interface for displaying the notification. The remote control and/or monitoring circuitry 26 may provide audible alerts, visual alerts, tactile alerts, and any other suitable alert. In certain embodiments, the notification may include an instruction to replace the bearing 34 and/or the wear indicator 32. As such, a user of the linear motor system 10 may be notified of the amount of wear of the bearing 34 and may be instructed to replace the wear indicator 32 and/or the bearing 34 of the mover 18. The platform 44 is provided on the mover 18 for mounting tools, loads, and the like. The bearing 34 may be mounted to the mechanical structure (e.g., the housing) of the mover 18 and may serve to interact with one or more rails 48 of the track. The bearing 34 and rails 48 of the track may allow the mover 18 to remain securely attached to the track section 16 while allowing relatively free movement of the movers 18 along the track section 16 and supporting mechanical loads and forces encountered during motion.

The track section 16 may include a series of parallel coils 50 that are associated with a stator or armature 52. In currently contemplated embodiments, these coils 50 may be mounted into slots in the stator 52, and the stator 52 itself may be made of magnetic material formed into a stack of laminates and structured to allow for mounting within the track section 16 housing. Particular configurations, magnetic structures, mounting structures and the like of the coils 50 and stator 52 components are generally beyond the scope of the present disclosure. Drive circuitry 54 may be included in each track section 16 as discussed above to allow for controlled power signals to be applied to the coils 50 in order to drive and position the movers 18 appropriately around the track section 16. Finally, a sensor array 58 is provided in each track section 16 to allow for interaction with the sensor components 42 of the movers 18. This sensor array 58 may provide feedback that can indicate the position of the movers 18, and can be used to derive velocity, acceleration, jerk, and other motion parameters. In the illustrated embodiment, a number of track sections 16 may be mounted end-to-end and interconnected with one another and/or with the power and control circuitry 24 to receive signals used to power the coils 50.

As will be appreciated by those skilled in the art, track sections 16, along with the magnet arrays 38 of the movers 18, may generally form what may be considered the linear motor system 10. That is, electromotive force is generated by the controlled fields of the coils 50 and interaction between these fields and the magnetic fields of the magnet array 38 serve to drive the mover 18 into desired positions, at desired speeds, and so forth. As noted above, these coils 50 and the linear motor itself may be designed in accordance with various configuration strategies, such as ones having the coils 50 arranged around a periphery of the track sections 16, ones in which the coils 50 are generally planar (in a top or bottom position of the track sections 16), and so forth. Although the "linear" motor system 10 may be used in the present disclosure, it should be appreciated that curved sections in various configurations are intended to be included in the scope of the present disclosure.

Figure 4:
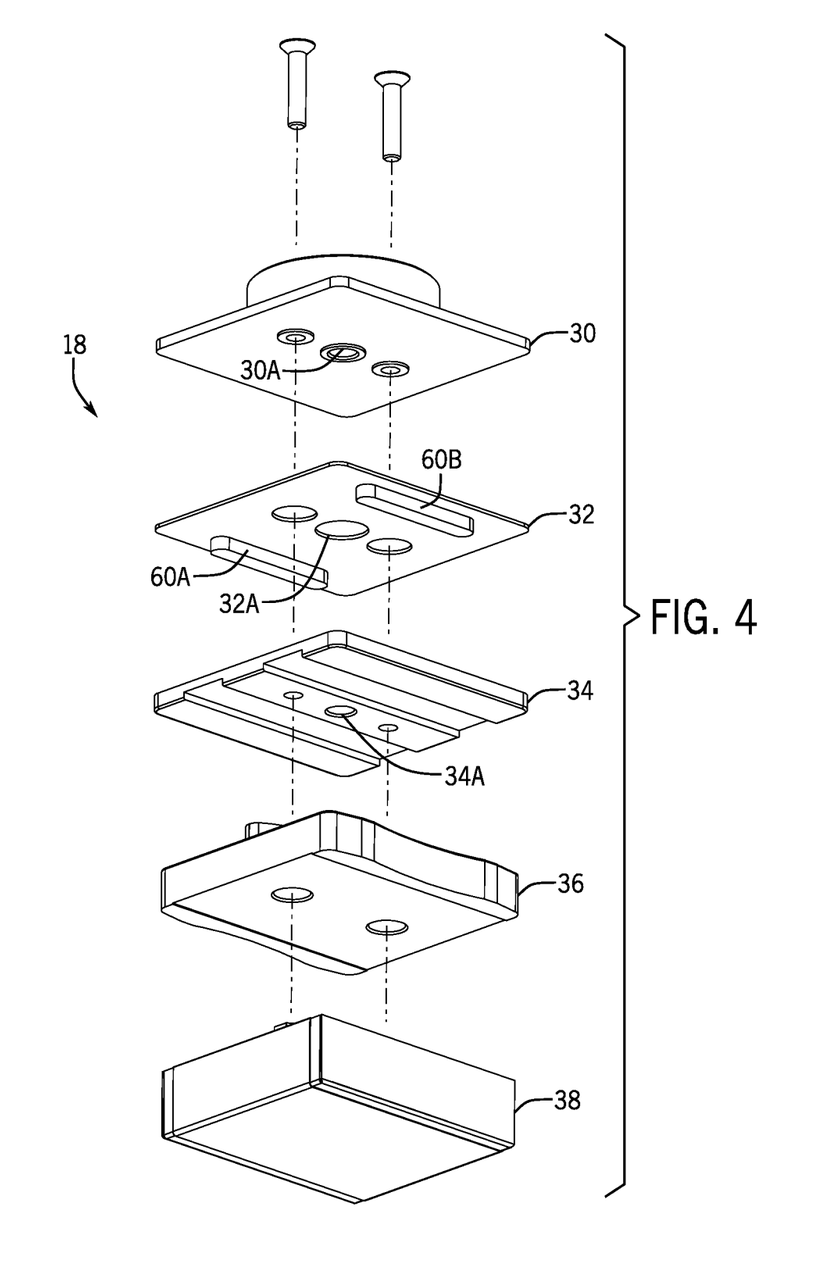
FIG. 4 is an exploded view of one of the movers of FIG. 1 including a wear indicator, in accordance with embodiments described herein.

With the foregoing in mind, FIG. 4 illustrates a perspective view of the mover 18 of FIG. 1 including the wear indicator 32, in accordance with an embodiment of a present disclosure. The housing 30 may include a bore 30A therethrough and the bore 30A may receive a fastener to couple the housing 30 and the plate 36. The wear indicator 32 may include any number of tabs, such as tabs 60A, 60B, and the tabs 60A, 60B may be at least partially disposed in a portion of the bearing 34. For example, the bearing 34 may include any number of recesses extending partially into the bearing and configured to receive any number of tabs of the wear indicator 32. The tabs 60A, 60B may be located towards an outer periphery of the wear indicator 32 and may be located on a surface of the wear indicator 32 facing the rails 48. The tabs 60A, 60B may be located on the surface of the wear indicator 32 such that at least a portion of the tabs 60A, 60B may be positioned above a corresponding rail 48 of the track when the mover 18 is placed on the track section 16. The tabs 60A, 60B may engage the rails 48 of the track section 16 after a threshold amount of wear of the bearing 34. For example, at least a portion of the tabs 60A, 60B may engage the rails 48 and may slow down and/or may stop the mover 18. The wear indicator 32 may include a bore 32A therethrough and the bore 32A may receive a fastener to couple the housing 30 and the wear indicator 32. The bearing 34 may include a bore 34A therethrough and the bore 34A may receive a fastener to couple the housing 30 and the bearing 34. Additionally or alternatively, any number of components may be replaceable for the mover 18. For example, the bearing 34 and/or the wear indicator 32 may be replaced by removing the housing 30 after a threshold amount of wear occurs on the bearing 34.

Figure 5:
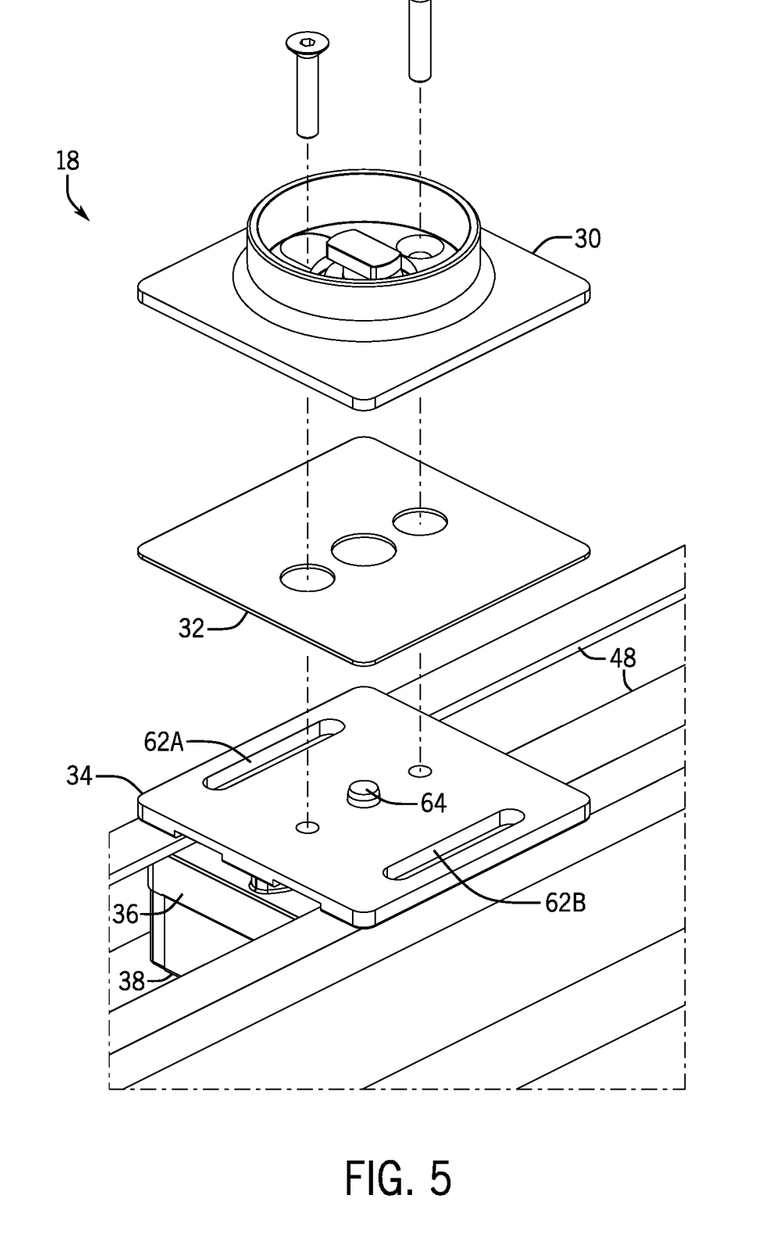
FIG. 5 is a perspective view of one of the movers of FIG. 1 on a track of the linear motor system, in accordance with embodiments described herein.

With the foregoing in mind, FIG. 5 illustrates a perspective view of the mover 18 disposed on the rails 48 of the track, in accordance with an embodiment of the present disclosure. The bearing 34 may include any number of recesses, such as recesses 62A, 62B, extending from a surface of the bearing 34 partially into the bearing toward an opposite surface. For example, the recesses 62A, 62B may be formed in a surface facing the wear indicator 32. The recesses 62A, 62B may be formed in a portion of the bearing 34 such that the recesses 62A, 62B are at least partially disposed above a corresponding rail 48 of the track when the mover 18 is placed on the track section 16. The recesses 62A, 62B may receive at least one tab of the wear indicator 32, such as tabs 60A, 60B shown in FIG. 4. The recesses 62A, 62B may retain and hold the wear indicator 32 in place. The mover 18 may include a fastener 64 and the fastener 64 may couple the housing 30 to the plate 36.

Figure 6:
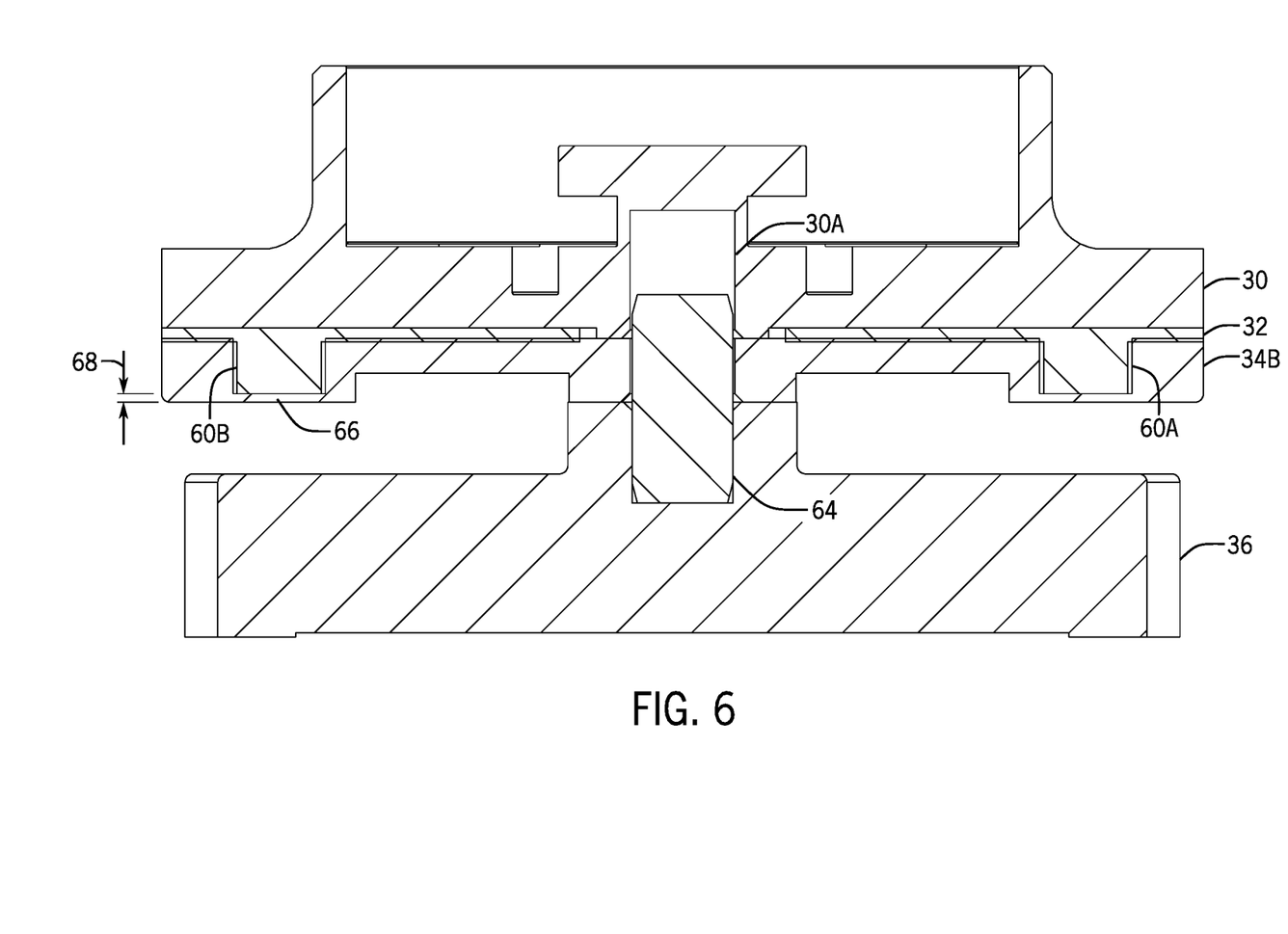
FIG. 6 is a cross-sectional view of one of the movers of FIG. 1 including the wear indicator, in accordance with embodiments described herein.

With the foregoing in mind, FIG. 6 illustrates a cross-sectional view of the mover 18, in accordance with an embodiment of the present disclosure. Each tab 60A, 60B of the wear indicator 32 may be at least partially disposed in corresponding recess of the bearing 34. A portion 66 of the bearing 34 may engage the rails 48 as the mover 18 moves along the track and the portion 66 of the bearing 34 may have a thickness 68. The thickness 68 may be selected based on a threshold distance range between the magnet array 38 (e.g., permanent magnets 40) and the coils 50. For example, the thickness 68 of the portion 66 of the bearing 34 may be 1 mm or less (e.g., 0.75 mm, 0.6 mm, 0.5 mm, 0.25 mm, and so forth). In certain embodiments, the thickness 68 may be equal to or less than a difference between an upper bound and a lower bound of the threshold distance range. For example, the upper bound of the threshold distance range may be at least 1 mm (e.g., 2 mm, 5 mm, 8 mm, 10 mm, and so forth) and the lower bound of the threshold distance range may be at least 0.25 mm (e.g., 0.5 mm, 0.75 mm, 1 mm, and so forth). As such, the thickness 68 of the portion 66 may be up to the difference between the upper bound and the lower bound (e.g., up to 0.75 mm). The mover 18 may move along the rails 48 until the portion 66 of the bearing 34 having the thickness 68 wears down. Once the portion 66 of the bearing 34 wears down, one or more of the tabs 60A, 60B of the wear indicator 32 may be exposed and may engage one or more of the rails 48. Engagement between one of more of the tabs 60A, 60B and one or more of the rails 48 may slow down and/or may stop the mover 18. In certain embodiments, the wear indicator 32 may provide a notification (e.g., via the sensor component 42, via visual inspection, via the remote control and/or monitoring circuitry 26) to notify a user of the linear motor system 10 to replace the bearing 34 and/or the wear indicator 32. As such, the wear indicator 32 may reduce inefficient operation of the linear motor system 10 including the mover 18 and/or may prevent damage to components of the linear motor system 10 due to wear. Additionally or alternatively, the bearing 34 may include a visual indicator (e.g., a notch, a marking) on one or more outer walls, such as outer wall 34B of the bearing 34. The visual indicator may be located on the outer wall 34B of the bearing 34 at a threshold distance from a bottom surface (e.g., the surface facing the plate 36) of the bearing 34. In certain embodiments, the threshold distance may be equal to or less than the thickness 68 of the portion 66 of the wear indicator 32. As the mover 18 moves along the track, the bearing 34 may wear down and the bottom surface of the bearing 34 may move towards the visual indicator as more material from the bottom surface of the bearing 34 is removed. Accordingly, the visual indicator may provide an indication of when to replace the bearing 34 and/or wear indicator 32 of the mover 18. As such, a user of the linear motor system 10 with the mover 18 may visually inspect the outer wall 34B of the bearing to determine whether the bearing 34 has worn down sufficiently to require replacement.

The present disclosure includes wear indicators present in movers in linear drive transport systems. The wear indicators provide failsafe operation of the movers after excessive wear of bearings of the movers. The wear indicators slow and/or bring the movers to a stop on qthe track to reduce the risk of damage to the linear motors and movers. The wear indicators and bearings are also designed to be removably coupled to the movers and replaceable due to wear. Technical effects of the disclosed techniques include prolonging operational lifetime of bearings and movers, providing a modular system for replacing bearings and wear indicators within a mover, and preventing damage to linear motors and movers due to excessive wear of bearings.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A mover of a linear motor system, comprising:
   a housing;
   a material coupled to the housing, the material comprising one or more protrusions configured to extend towards a track of the linear motor system; and
   a bearing configured to interface with the track, wherein the bearing comprises one or more recesses extending from a first surface of the bearing toward a second surface of the bearing, opposite the first surface, wherein each of the one or more recesses is configured to receive a respective protrusion of the one or more protrusions of the material, wherein the bearing is configured to wear away from the second surface over time as the mover travels along the track, exposing the one or more protrusions to the track.

2. The mover of claim 1, wherein the one or more protrusions comprise a first protrusion and a second protrusion, and wherein the one or more recesses comprise a first recess and a second recess configured to engage with the first protrusion and the second protrusion, respectively.

3. The mover of claim 1, wherein the one or more protrusions of the material are configured to resist movement of the mover along the track when the one or more protrusions are exposed to the track.

4. The mover of claim 1, wherein the bearing comprises a plastic material, a polymer material, or a combination thereof.

5. The mover of claim 1, wherein the material comprises a rubber material, a cork material, or a combination thereof.

6. The mover of claim 1, wherein:
the bearing comprises a first material;
the material comprises a second material; and
the first material has a lower coefficient of friction with the track than the second material.

7. The mover of claim 1, comprising a sensor configured to detect the track is within a threshold distance of the one or more protrusions of the material.

8. The mover of claim 7, wherein the sensor is configured to generate a signal, wherein the signal is configured to cause a computing device to generate an audible alert, a tactile alert, a visual alert, or any combination thereof.

9. The mover of claim 1, wherein the bearing is configured to wear away from the second surface, exposing the one or more protrusions to the track after the mover has traveled a threshold distance along the track.

10. The mover of claim 9, wherein the threshold distance is 10,000 kilometers.

11. A linear motor system, comprising:
a track section comprising a plurality of coils energizable to create a controlled magnetic field; and
a mover configured to be displaced by the controlled magnetic field, the mover comprising:
a magnet array configured to be disposed a threshold distance range away from the plurality of coils; and
a wear indicator comprising a tab, wherein the tab of the wear indicator is configured to interface with the track section of the linear motor system when the magnet array falls outside the threshold distance range from the plurality of the coils.

12. The linear motor system of claim 11, wherein the mover comprises a bearing configured to interface with the track section, wherein the bearing comprises a recess extending from a first surface of the bearing toward a second surface of the bearing, opposite the first surface, wherein the recess is configured to receive the tab of the wear indicator, wherein the bearing is configured to wear away from the second surface over time as the mover travels along the track section, exposing the tab to the track section.

13. The linear motor system of claim 12, wherein the bearing comprises a thickness between the recess and the second surface that is equal to or less than a difference between an upper bound of the threshold distance range and a lower bound of the threshold distance range.

14. The linear motor system of claim 13, wherein the thickness is equal to or less than 1 mm.

15. The linear motor system of claim 11, wherein the tab of the wear indicator is configured to resist movement of the mover when interfacing with the track section.

16. A method, comprising:
operating a plurality of coils of a track to create a controlled magnetic field;
moving a mover along the track with the controlled magnetic field, wherein a bearing of the mover is configured to interface with the track and wear away over time as the mover travels along the track; and
in response to the mover traveling a threshold distance along the track, exposing a wear indicator configured to interface with the track, wherein the wear indicator is configured to reduce movement of the mover along the track.

17. The method of claim 16, comprising detecting the track is within a threshold distance of the wear indicator.

18. The method of claim 17, comprising generating a signal based on detecting the track is within the threshold distance, wherein the signal is configured to cause a computing device to generate an audible alert, a tactile alert, a visual alert, or any combination thereof.

19. The method of claim 16, wherein the wear indicator is configured to prevent movement of the mover along the track.

20. The method of claim 16, comprising detecting the bearing has worn away a threshold amount.

* * * * *